United States Patent Office 2,946,990
Patented July 26, 1960

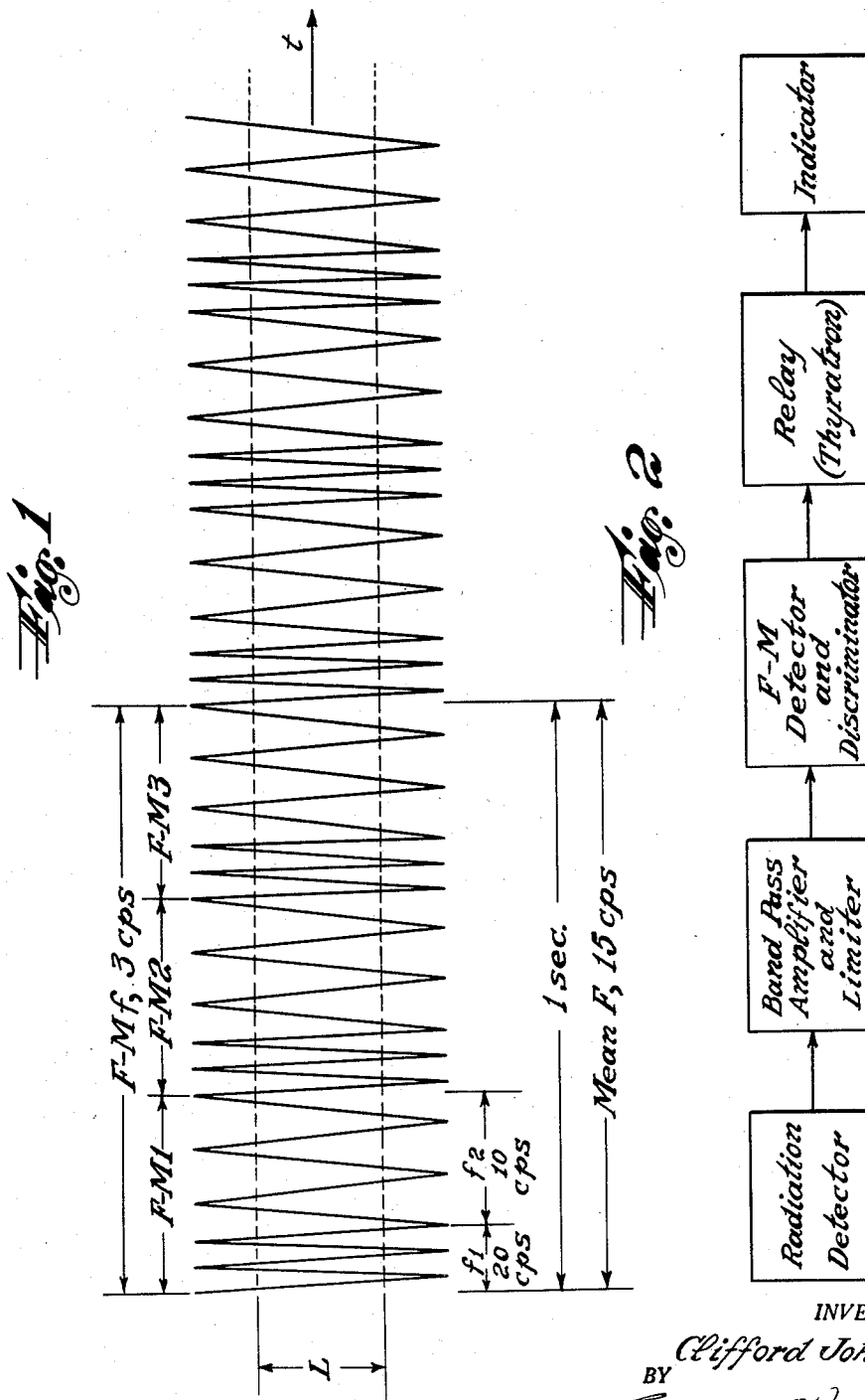

2,946,990

APPARATUS FOR DETECTING FLAME

Clifford John Klein, Riverdale, N.J., assignor to Specialties Development Corporation, Belleville, N.J., a corporation of New Jersey Filed Sept. 14, 1954, Ser. No. 455,927

6 Claims. (Cl. 340—227)

The present invention relates to detecting flame, and, more particularly, to an improved radiant energy sensitive apparatus for detecting flame in response to flame frequencies.

It is well known that the flame of combustible materials flickers at frequencies between about 4 and about 20,000 cycles per second due to an uneven burning process which results in the emission of radiant energy including visible and invisible light; and that sufficient radiant energy in the range of 5 to 30 cycles per second is emitted to assure its detection. Radiant energy at such flicker frequencies can be detected by radiant energy sensitive devices such as photoelectric cells or tubes and the like, coupled with apparatus having an output, responsive only to these flicker frequencies, which output can be utilized to control means for indicating that such flicker frequencies are being detected. Consequently, fire detecting apparatus has been devised which utilizes this phenomenon to operate an alarm for indicating the presence of flame and/or for initiating operation of a fire extinguishing system.

It has been found that such systems have numerous disadvantages when installed in locations where radiant energy from a source other than that of a flame, under certain conditions, can affect the radiant energy sensitive device. For example, on board aircraft or other craft subjected to mechanical vibrations, the radiant energy sensitive device may be periodically exposed to daylight by the movement of structure under the influence of mechanical vibration, such as cowl flap flutter, or by propeller light chopping effects; or may be exposed to the flickering of a lamp connected in a faulty circuit which is periodically interrupted due to vibrations. In the event the frequencies of such light or radiant energy interruptions are within the band of flicker frequencies sought to be detected, the system may be subjected to false operation which is highly undesirable.

In accordance with the present invention, it has been discovered that the frequency at which a flame flickers varies constantly, and that such flicker frequency variations, within a given period of time, follow a recognizable pattern having a frequency or band of frequencies of its own which in a sense is comparable to frequency modulation as used in FM radio transmission. Consequently, it is now proposed to utilize this frequency modulation phenomenon to discriminate between flame flicker and light or radiant energy chopping or the like and thereby eliminate false operation.

Accordingly, an object of the present invention is to provide a simple, practical and reliable apparatus for detecting flame.

Another object is to provide such apparatus which is compact and economical in construction.

A further object is to provide such apparatus comprising conventional electrical components arranged in well known circuits which are combined in a novel manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Fig. 1 is a graphic illustration of radiant energy waves detected in a flame which waves have flicker frequency modulation.

Fig. 2 is a block diagram illustrating one form of flame detecting apparatus in accordance with the invention.

Referring to Fig. 1 of the drawing, the radiation waves detected in a flame are graphically illustrated as recorded by an oscillograph. While such waves actually vary greatly in amplitude and in fundamental frequency, they are shown in simplified form herein to facilitate understanding the present invention. To accomplish this, these waves are shown as having a constant amplitude and a mean fundamental frequency F of about 15 cycles per second derived by alternate frequency changes from about 10 to about 20 cycles per second ($f_2$ and $f_1$). Such frequency changes take place gradually, rather than abruptly as shown to more clearly illustrate the same, and occur at a frequency of between about 1 and about 10 cycles per second, for example, at 3 cycles per second as shown herein. This phenomenon may be characterized as flame flicker frequency modulation F-Mf, and can be detected and then translated into electrical energy for controlling indicating means in response to the characteristics of the flame observed.

In Fig. 2, there is shown a block diagram of apparatus for detecting flicker frequency modulation in a flame, converting the radiant energy to electrical energy, and utilizing the frequency modulation in such electrical energy to produce a signal for operating indicating means. Since such networks and the components thereof are generally known individually and can be found in prior literature, detailed illustration and description thereof are believed to be unnecessary.

The apparatus illustrated herein essentially comprises a flame detector, a band pass amplifier, a limiter, a frequency modulation detector and discriminator, a relay, and an indicator.

The flame detector is a device capable of detecting the radiant energy of an open flame and responding thereto to produce an electrical signal corresponding substantially to the radiant energy being emitted. Preferably, this device is any one of the many types adapted to detect radiations in the infra-red region of the flame spectrum, whereby to render the apparatus insensitive to radiations in other regions of the spectrum. For example, such a device may be a bolometric tube, a lead sulphide cell or their equivalents.

The function of the band pass amplifier is to amplify the flame detector output within a certain band of frequencies so that the radiant energy of even the smallest detectable flame at the commencement of a fire causes the apparatus to give an indication thereof. However, since the amplitude of the radiant energy of a minimum flame and that of a flame of a raging fire varies so greatly, a limiter is used which functions to confine its output to a predetermined maximum amplitude including the peaks of all the amplified waves detected in a minimum flame but excluding the peaks of the waves of higher amplitudes. The limiter thereby removes any amplitude modulation, whereby the output signal of the limiter has a wave pattern similar to the portions of the waves within the zone L defined by the parallel broken lines in Fig. 1. In this manner, an input of constant amplitude is supplied to the frequency modulation detector and discriminator.

The function of the frequency modulation detector and discriminator is to detect fluctuations in the fundamental flicker frequency, acting as a carrier, and to produce a signal in response to a given frequency of such fluctuations or within a given band of such fluctuations, for example, 1 to 8 cycles per second. Since the wave shown in Fig. 1 has a modulated frequency of 3 cycles per second which falls within the band to which the discriminator may be tuned, the discriminator produces an output signal in response to such modulated frequency.

The function of the relay is to enable the signal or output of the discriminator to cause an indicator to be operated. Since the discriminator output is not of a value sufficient to operate a lamp, bell, buzzer or other indicator, the output is utilized to trigger a thyratron which controls an electro-magnetic relay adapted to close a switch in the indicator circuit.

From the foregoing description, it will be seen that the present invention provides a simple, practical and reliable apparatus for detecting a flame which eliminates all possibilities of false operation due to radiant energy varying at a constant frequency, it being inconceivable that signals produced by such a source would have a modulated frequency corresponding to a value within the band to which the discriminator is tuned.

It will be understood that the frequency values to which the apparatus is tuned are illustrative only, and that the apparatus is adapted to be utilized in connection with the detection of radiant energy within any desired band of frequencies of the flame flicker spectrum. Also, the present invention contemplates that frequency modulation within the output signal of the FM discriminator can be detected and discriminated stage-wise, ad infinitum, whereby to operate the indicator in response to very specific flame flicker frequency patterns.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a flame detecting apparatus, the combination of means having an output responsive to flame flicker frequencies, means for detecting variations in the frequency of the output, and means controlled by said last mentioned means for giving an indication that a variation in frequency is being detected.

2. In a flame detecting apparatus, the combination of an infra-red energy detector, means controlled by said detector having an output responsive to flame flicker frequencies, a frequency modulation discriminator for producing a signal in response to variations in the flicker frequency of the output, and means controlled by the signal of said discriminator for giving an indication that frequency variations are being detected.

3. In a flame detecting apparatus, the combination of means having an output responsive to flame flicker frequencies, means for controlling the amplitude of the output, means for detecting variations in the frequency of the output, and means controlled by said last mentioned means for giving an indication that a variation in frequency is being detected.

4. In a flame detecting apparatus, the combination of means having an output responsive to flame flicker frequencies, means for limiting the amplitude of the output, means for detecting variations in the frequency of the limited output, and means controlled by said last mentioned means for giving an indication that a variation in frequency is being detected.

5. In a flame detecting apparatus, the combination of means having an output responsive to flame flicker frequencies, means for amplifying the output and limiting the amplitude of the output, means for detecting variations in the frequency of the output, and means controlled by said last mentioned means for giving an indication that a variation in frequency is being detected.

6. In a flame detecting apparatus, the combination of an infra-red energy detector having an output responsive to flame flicker frequencies, a band pass amplifier and limiter network for controlling the output, a frequency modulation discriminator for producing a signal in response to variations in the frequency of the network output, and means controlled by the signal of said discriminator for giving an indication that frequency variations are being detected.

References Cited in the file of this patent

UNITED STATES PATENTS

| | | |
|---|---|---|
| 2,349,715 | Francis | May 23, 1944 |
| 2,607,899 | Cary et al. | Aug. 19, 1952 |
| 2,655,645 | Bango | Oct. 13, 1953 |
| 2,722,677 | Krueger | Nov. 1, 1955 |
| 2,749,447 | Smith | June 5, 1956 |
| 2,811,711 | Cade et al. | Oct. 29, 1957 |
| 2,834,008 | Carbauh | May 6, 1958 |